(12) United States Patent
Berard

(10) Patent No.: US 7,659,320 B2
(45) Date of Patent: Feb. 9, 2010

(54) METHOD FOR EXTRACTING NYLON FROM WASTE MATERIALS

(75) Inventor: Raymond A. Berard, Kennesaw, GA (US)

(73) Assignee: Interface, Inc., Atlanta, GA (US)

( * ) Notice: Subject to any disclaimer, the term of this patent is extended or adjusted under 35 U.S.C. 154(b) by 0 days.

(21) Appl. No.: 09/852,855

(22) Filed: May 10, 2001

(65) Prior Publication Data

US 2002/0077375 A1 Jun. 20, 2002

Related U.S. Application Data

(60) Provisional application No. 60/245,006, filed on Nov. 1, 2000.

(51) Int. Cl.
*C08J 11/08* (2006.01)

(52) U.S. Cl. .......................... 521/40; 528/495

(58) Field of Classification Search ................ 521/49.8, 521/40; 528/495, 496, 499
See application file for complete search history.

(56) References Cited

U.S. PATENT DOCUMENTS

| | | | |
|---|---|---|---|
| 2,742,440 A * | 4/1956 | Stott et al. ............... | 260/2.3 |
| 3,696,058 A | 10/1972 | Teti | |
| 4,028,159 A | 6/1977 | Norris | |
| 4,146,704 A | 3/1979 | Seki et al. | |
| 4,334,056 A * | 6/1982 | Meyer et al. ............... | 528/496 |
| 5,169,870 A | 12/1992 | Corbin et al. | |
| 5,230,473 A | 7/1993 | Hagguist et al. | |
| 5,411,710 A | 5/1995 | Iwasyk | |
| 5,430,068 A | 7/1995 | Subramanian | |
| 5,457,197 A | 10/1995 | Sifniades et al. | |
| 5,497,949 A | 3/1996 | Sharer | |
| 5,518,188 A | 5/1996 | Sharer | |
| 5,535,945 A | 7/1996 | Sferrazza et al. | |
| 5,656,757 A | 8/1997 | Jenczewski et al. | |
| 5,681,952 A | 10/1997 | Sifniades et al. | |
| 5,840,773 A * | 11/1998 | Booij et al. ............... | 521/49 |
| 5,889,142 A | 3/1999 | Mohajer et al. | |
| 5,898,063 A | 4/1999 | Stefandl | |
| 5,929,234 A | 7/1999 | Sifniades et al. | |
| 5,932,724 A | 8/1999 | Sifniades et al. | |
| 6,029,916 A | 2/2000 | White | |
| 6,036,726 A * | 3/2000 | Yang et al. ............... | 8/102 |
| 6,126,096 A | 10/2000 | Robinson et al. | |
| 6,211,275 B1 | 4/2001 | Xanthos et al. | |
| 6,214,908 B1 | 4/2001 | Lem et al. | |
| 6,228,479 B1 | 5/2001 | Zegler et al. | |
| 6,342,555 B2 | 1/2002 | Sifniades et al. | |
| 6,398,138 B1 | 6/2002 | Robinson et al. | |
| 6,752,338 B2 | 6/2004 | Wingard | |
| 2006/0031997 A1 * | 2/2006 | Berard et al. ............... | 8/102 |

FOREIGN PATENT DOCUMENTS

CA 788009 6/1968

OTHER PUBLICATIONS

Mihut, C. et al., "Review: Recycling of Nylon From Carpet Waste," *Polymer Engineering and Science*, vol. 41, No. 9, Sep. 2001, pp. 1457-1470.

* cited by examiner

*Primary Examiner*—Tae H Yoon
(74) *Attorney, Agent, or Firm*—Kilpatrick Stockton LLP

(57) ABSTRACT

The invention relates to a method for recovering nylon from a nylon-containing material by contacting the nylon-containing material with an alkanol-containing solvent at elevated temperature and at a pressure higher than the equilibrium pressure of the alkanol-containing solvent at the elevated temperature, thereby dissolving the nylon in the alkanol-containing solvent, removing the alkanol-containing solvent containing dissolved nylon from any undissolved solids, and decreasing the temperature of the alkanol-containing solvent containing dissolved nylon to precipitate the dissolved nylon.

18 Claims, No Drawings

METHOD FOR EXTRACTING NYLON FROM WASTE MATERIALS

This application claims benefit of provisional U.S. application Ser. No. 60/245,006, filed Nov. 1, 2000, the entire contents of which are incorporated by reference.

BACKGROUND OF THE INVENTION

1. Field of the Invention

The present invention relates to improved processes for extracting nylon from waste materials, including mixed waste materials such as floor coverings, such that degradation of the nylon polymer into lower molecular weight polymers, oligomers, and monomers is decreased. The process involves contacting the waste materials with polar solvents, or mixtures thereof at high pressures.

2. Description of Related Art

Nylon is widely used as a fiber, both in the production of textile cloths, and in the production of floor covering materials, such as broadloom carpet and carpet tile. When used in floor covering materials, the nylon is usually predominantly present as part of one or more layers of a multilayered product. Large quantities of floor covering materials are replaced each year, with the resulting used materials often discarded to landfills. Because of environmental and economic concerns about this waste material, there has been a need for an economical process for recovering and reusing used or discarded floor covering materials. However, because these materials often contain complicated composites or laminates that are difficult to separate into their constituent components, recycling processes for these materials too often result in conglomerated products whose value is considerably lower than that of their individual constituents. In some cases, the value of the product of recycling may be equal to or less than the value of the original starting material. Downcycling of this nature is both environmentally and economically wasteful. Because the downcycled product is not as valuable as the original starting material, or even of the original inputs to the production of the original waste material, economic value is lost. Because the downcycled product does not make the best use of its constituents, additional constituent materials must be produced and used, generating an additional environmental burden made particularly heavy because these constituent materials are often based on petrochemicals.

As a result of these considerations, there is a need in the art for processes that can economically separate and recycle one or more of the components of floor covering materials. In particular, there is a need in the art for processes that allow for the separation and recovery of nylon used in floor covering materials, and in particular, of nylon used in the topcloth or facecloth layers of these floor covering materials, in such a way that the value and usefulness of the nylon is not degraded.

Processes for recovering nylon tend to fall into two distinct categories. In one category are processes where the nylon is deliberately depolymerized into monomer or oligomers thereof, which can then be reused by repolymerization. In general, the goal is to reduce as much of the polymer to monomer as possible, in order to make reuse more predictable. However, processes in this category are disadvantageous because depolymerization is expensive, and can lead to side reactions that decrease the amount of monomer available, reducing efficiency, and requiring additional depolymerization and energy consumption to make up for the loss. In addition, depolymerization of nylon 6,6 requires the separation of hexamethylenediamine (HDMA) and adipic acid, or further reaction to convert adipic acid to HDMA, which is difficult and expensive.

In the other category are processes where the nylon is recovered without depolymerization, so that it can be reused without repolymerization. In general, the goal of such processes is to extract or dissolve the nylon with minimal polymer breakdown. The nylon is then generally obtained in solid form so that it can be reused. Conventional dissolution or extraction type processes can be difficult, if not impossible, to use without downcycling the value of the nylon. At least part of the reason for this is that some polymer breakdown almost always occurs.

For example, nylon fiber that is to be subjected to a dissolution or extraction type recovery process will have had its molecular weight reduced by the original extrusion process, due to the high temperatures involved. Molecular weight will be reduced further during the conventional extraction or dissolution process, and will be even further reduced if the nylon is to be re-extruded back into fiber. This cumulative breakdown will render the molecular weight of the nylon inappropriate for reuse as fibers.

Another disadvantage of both types of nylon recycling processes is their need for relatively pure nylon feedstocks. In the case of composite products, such as floor coverings like carpet and carpet tile, the presence of fillers, backing materials, adhesives, etc. can complicate the nylon recycling effort, requiring that these materials be physically and/or chemically separated from the nylon prior to any nylon-specific processing.

There is therefore a need in the art for a nylon recycling process that does not require depolymerization, that does not significantly degrade the molecular weight of the nylon polymer recovered, and that is useful to prepare nylon suitable for extrusion into fiber using as a feedstock nylon that has previously been extruded into fiber, and in particular, nylon that has been obtained from floor covering material, without the need to delaminate or otherwise physically separate other components from the feedstock.

SUMMARY OF THE INVENTION

The process of the invention fulfills this need. Nylon, which may be obtained in the form of waste material, such as waste or scrap floor covering material (obtained, e.g., from used carpet, carpet tile, or other floor covering, or as selvedge produced in the manufacture of carpet or carpet tile), is contacted with a solvent or solvent mixture containing an alcohol at an elevated temperature, and at an elevated pressure. The use of an elevated pressure has been found to unexpectedly decrease the temperature at which the nylon in the waste material will effectively dissolve in the solvent mixture. At least in part as the result of this decrease in dissolution temperature, the nylon can be dissolved with a substantially decreased degradation of its molecular weight. This preservation of molecular weight allows the process to be effectively used with nylon that has been extruded into fiber, such as that found in floor coverings, and produces nylon that can again be extruded into fiber, for use in floor coverings. In effect, the process of the invention allows the nylon present in floor coverings to be recycled without being downcycled. Although the process can be used with nylon that has been separated from other composite material components, this need not occur with commonly used floor covering materials.

The invention can be viewed as a method for recovering nylon, including:

contacting the nylon with an alkanol-containing solvent at elevated temperature and at a pressure higher than the equilibrium pressure of the alkanol-containing solvent at the elevated temperature;

removing alkanol-containing solvent containing dissolved nylon from any undissolved solids;

decreasing the temperature of the alkanol-containing solvent containing dissolved nylon to precipitate the dissolved nylon. The recovered nylon can then be further processed by filtration, washing, etc., and reused.

The increase in pressure of the nylon and alkanol-containing solvent mixture can be accomplished by introducing inert gas into the dissolution vessel, which is desirably a pressure vessel. Alternatively, the increase in pressure of the solvent mixture can be accomplished by increasing the head pressure of the solvent mixture pumped into the reactor. For instance, the vessel through which solvent is introduced to the reactor could have a cross-sectional area that exceeds that of the vessel through which solvent is withdrawn from the reactor, creating a pressure head in the reactor sufficient to lower the nylon dissolution temperature, and thus the reactor temperature, as described herein.

The method of the invention is suitable for recovering nylon from waste materials, and is particularly suitable for use with nylon-containing floor covering waste materials, such as used or scrap carpet or carpet tile, or selvedge obtained during production of these materials. In particular, use of the method with carpet tile has been found to be very beneficial, since these materials are typically composite structures having a number of laminated layers. The method of the invention provides the additional benefit of making separation of these laminated layers easier, and in many cases the waste materials emerge from the dissolution process with the nylon removed and the remaining layers of materials already separated. This confers apparent advantages in making the recycling of these additional components much more efficient.

DETAILED DESCRIPTION OF SPECIFIC EMBODIMENTS OF THE INVENTION

The invention involves the use of a solvent or mixture of solvents, containing a lower alkanol, to dissolve nylon, which is desirably in the form of nylon 6,6, but which may include other nylons or combinations thereof. The nylon, which may be ground, comminuted, chopped or otherwise modified in size, may be added as waste or scrap floor covering material, such as carpet or carpet tile, or as some other composite material, or as essentially pure nylon, is contacted with the solvent or solvent mixture in a pressure vessel. The pressure vessel is heated to a temperature of about 130° C. to about 155° C., more particularly to about 145° C., and held at this temperature for a period of time sufficient to dissolve the desired yield of nylon. Surprisingly, this use of increased pressure allows operation at temperatures below 160° C.

The pressure vessel is maintained at a pressure higher than the equilibrium pressure for the solvent system at the selected temperature. One technique for increasing the pressure is to introduce a sufficient quantity of inert gas, such as nitrogen, argon, etc. into the pressure vessel. For example, at a temperature of about 150° C., the equilibrium pressure of an ethanol/water solvent system will be approximately 100 psig. This pressure can be increased by an amount ranging from about 250 psig to about 600 psig, more particularly from about 250 psig to about 400 psig, by adding inert gas, such as $N_2$, to the pressure vessel prior to reaction. Alternatively, the pressure in the vessel can be increased by increasing the head pressure of the solvent system entering the reactor. This can be done, e.g., by removing liquid from the reactor through a vessel having a smaller cross-sectional area than the vessel delivering solvent to the reactor. This increased pressure allows increased and faster dissolution of the nylon into the solvent system as compared to the dissolution level and rate at the equilibrium pressure for that temperature. Put another way, for the same dissolution level, the invention allows the process to be operated at a lower temperature than would an equilibrium pressure process, or even a slightly elevated (e.g., 50 psig) pressure process. Degradation of the nylon is thus decreased, resulting in a higher quality product that is suitable for extrusion into fiber.

In addition, the process of the invention results in a nylon product that is enriched in high molecular nylon, as compared to conventional processes that are not carried out at increased pressure. As the nylon/solvent solution is cooled, high molecular weight nylon will precipitate first, and can therefore be filtered from the solution while maintaining the temperature of the solution between about 120° C. and about 130° C. This allows the low molecular weight materials, resulting from the previous extrusion or what little degradation in molecular weight does occur, to remain in solution and excluded from the nylon product. The solution also retains some soluble components that may be present in floor covering materials, such as plasticizers, lubricants, and coating materials.

Suitable solvents and solvent mixtures include lower alkanols, mixtures thereof, and mixtures of lower alkanols with water. More particularly, suitable lower alkanols include methanol, ethanol, propanols, butanols, and mixtures thereof. Mixtures of methanol and water or ethanol and water have been found to be particularly suitable. In particular, mixtures of ethanol and water are desirable because of the decreased environmental and regulatory concerns associated with using ethanol as compared to using other alkanols. When mixed with water, the alkanols are generally used in proportions ranging from about 40% to about 90% of alkanol:water. In particular, a 80% mixture of ethanol and water has been found to be suitable for most applications. Desirably, the solvent or solvent mixture is substantially free (i.e., does not contain more than about 1%) of glycols or other polyols.

After dissolution of, e.g., carpet scrap, in the pressure vessel, the mixture is removed from the pressure vessel, and the hot solution is filtered from the undissolved components, and is cooled to about 120° C. to about 130° C. to precipitate out the dissolved nylon. The nylon is filtered from the remaining solution, leaving in solution any high molecular weight oils, lubricants, plasticizers, and lower molecular weight nylon fractions as described above. The solvent mixture can be recovered by evaporation and/or distillation. The precipitated nylon can then be washed with a clean, hot alkanol/water mixture and dried, e.g., in a vacuum oven.

It has been found that the use of increased pressure allows the use of dissolution or extraction temperatures below 160° C., while maintaining the relative viscosity (an indicator of molecular weight) of the nylon at a level acceptable for use in fiber extrusion. While not wishing to be bound by any theory, it is believed that this effect results at least in part from better or more complete dissolution of low molecular weight nylon fractions, which then remain in solution as the higher molecular weight nylon fractions precipitate out.

The invention can be more clearly understood by reference to the following Examples, which are not intended to limit the scope of the invention in any way.

Example 1

A series of tests were conducted wherein nylon yarn or nylon chips were tested to determine a baseline relative viscosity. Nylon chips were also dissolved in a methanol/water mixture, the nylon recovered, and its relative viscosity measured. A number of nylon-containing carpet tiles (designated as Sample Nos. 1-6) were chopped up and placed into a pressure vessel to which 400 ml of an alkanol solvent and 100 ml water were added as indicated below, and the mixture heated and pressurized as indicated below. The solution was removed from the pressure vessel into another vessel, where it was cooled until nylon precipitated. This nylon was then tested for relative viscosity using the same method that was used for the nylon yarn or chips. The results are indicated below.

| Samples | Digestion Temp., °C. | Solvent (80% Concentration) | Final Pressure, psig | Relative Viscosity |
|---|---|---|---|---|
| Nylon 6,6 Yarn | Not digested | NA | NA | 44 |
| Standard PA 66 | Not digested | NA | NA | 45 |
| Standard PA 66 | 165 | Methanol | 205 | 34 |
| 1 | 165 | 99% Isopropanol | 140 | 40 |
| 2 | 165 | Denatured Ethanol | 400 | 37 |
| 3 | 175 | Denatured Ethanol | 150 | 34 |
| 4 | 165 | Pure Ethanol | 150 | 42 |
| 5 | 155 | Denatured Ethanol | 400 | 44 |
| 6 | 155 | Pure Ethanol | 450 | 48 |
| 7 | 150 | Pure Ethanol | 400 | 45 |
| 8 | 145 | Pure Ethanol | 400 |  |

Example 2

A similar procedure to that used in Example 1 was followed, using two samples from the same carpet tile or broadloom carpet, and varying the pressure thereof. The results are reported below. Where "Methanol" and "Pure Ethanol" are indicated, 400 ml. of these solvents were mixed with 100 ml of water. Where "100% Methanol" is indicated, water was not included in the mixture. Samples 1 and 3 were taken from carpet tile, Sample 2 was taken from broadloom carpet, and Sample 4 was taken from hot-melt precoated carpet.

| Samples | Digestion Temp., °C. | Solvent | Final Pressure, psig | Viscosity Number | Relative Viscosity |
|---|---|---|---|---|---|
| Nylon 6,6 Yarn | Not Digested | NA | NA | 135 | 44 |
| Standard PA 66 | Not Digested | NA | NA | 137 | 45 |
| Standard PA 66 | 165 | Methanol | 205 | 112 | 34 |
| 1A | 155 | 100% Methanol | 210 | 141 | 47 |
| 1B | 155 | Pure Ethanol | 150 | 141 | 47 |
| 2A | 155 | 100% Methanol | 210 | 162 | 60 |
| 2B | 155 | Pure Ethanol | 150 | 166 | 62 |

Example 3

An 80% mixture of ethanol and water was preheated to the temperatures indicated below, and added all at once to a vessel containing nylon fiber in sufficient amount to provide a 3.5 wt % mixture of solvent and nylon. The mixture was pressurized to the pressure indicated below, and held at pressure for the time indicated below. The liquid was removed from the vessel and cooled in a jacketed vessel to a temperature of 120° C. The resulting cooled liquid was filtered to removed precipitated nylon. The undissolved nylon remaining in the first vessel was measured, and a yield of dissolved nylon to total nylon added to the mixture was computed.

| Run | Temperature (° C.) | Pressure (psig) | Time (min.) | Yield (%) |
|---|---|---|---|---|
| 1 | 143 | 300 | 37 | 64 |
| 2 | 143 | 400 | 23 | 82 |
| 3 | 147 | 450 | 23 | 100 |
| 4 | 150 | 500 | 15 | 100 |
| 5 | 160 | 150 | 45 | 88 |

This description of specific embodiments of the invention is intended to enable those of skill in the art to more easily understand the nature of the invention, but not to limit the scope of the appended claims or the range of equivalents thereof.

What is claimed is:

1. A method for recovering nylon from a waste material comprising nylon, comprising:
   contacting the waste material comprising nylon with an alkanol-containing solvent at an elevated temperature between 130° C. and 155° C. and at a pressure higher than an equilibrium vapor pressure of the alkanol-containing solvent at the elevated temperature, and between 400 psig to 600 psig, and maintaining the pressure for a dissolution time sufficient to dissolve the nylon, thereby dissolving the nylon in the alkanol-containing solvent, wherein the combination of the pressure, temperature and the dissolution time provide a desired yield of nylon of at least 82%;
   removing the alkanol-containing solvent containing dissolved nylon from any undissolved solids;
   decreasing the temperature of the alkanol-containing solvent containing dissolved nylon to between 120° C. and 130° C. to precipitate dissolved nylon to generate precipitated nylon in remaining solution; and separating the precipitated nylon from the remaining solution.

2. The method of claim 1, wherein the waste material comprises a floor covering material.

3. The method of claim 1, wherein the nylon is nylon 6,6.

4. The method of claim 1, wherein the alkanol-containing solvent is substantially free of glycols or other polyols.

5. The method of claim 1, wherein the alkanol-containing solvent comprises an alkanol selected from the group consisting of methanol, ethanol, propanols, butanols, and mixtures thereof.

6. The method of claim 1, wherein the alkanol-containing solvent comprises a mixture of alkanol and water.

7. The method of claim 6, wherein the alkanol is present in an amount ranging from about 40 wt % to about 90 wt % of the solvent.

8. The method of claim 7, wherein the alkanol-containing solvent comprises a mixture of about 80 wt % ethanol in water.

9. The method of claim 1, wherein the pressure during the contacting ranges from 400 psig to 500 psig.

10. The method of claim 9, wherein the elevated temperature is about 145° C.

11. The method of claim 1, wherein the pressure higher than the equilibrium vapor pressure of the alkanol-containing solvent at the elevated temperature is attained by introducing an inert gas into the reactor.

12. The method of claim 1, wherein the pressure higher than the equilibrium vapor pressure of the alkanol-containing solvent at the elevated temperature results at least in part from the pressure head of the alkanol-containing solvent entering the reactor.

13. The method of claim 1, wherein the waste material comprises nylon-containing floor covering materials which comprise carpet or carpet tile, or mixtures thereof.

14. The method of claim 13, wherein the carpet or carpet tile contains nylon 6,6.

15. The method of claim 1, wherein the dissolution time is between 15 and 45 minutes.

16. The method of claim 15, wherein the dissolution time is between 15 and 37 minutes.

17. The method of claim 16, wherein the dissolution time is between 15 and 23 minutes.

18. The method of claim 1 wherein the temperature, the pressure and the dissolution time result in a yield of 82-100%.

* * * * *